Dwight Kimble INVENTOR.
BY
H. G. Burns ATTORNEY.

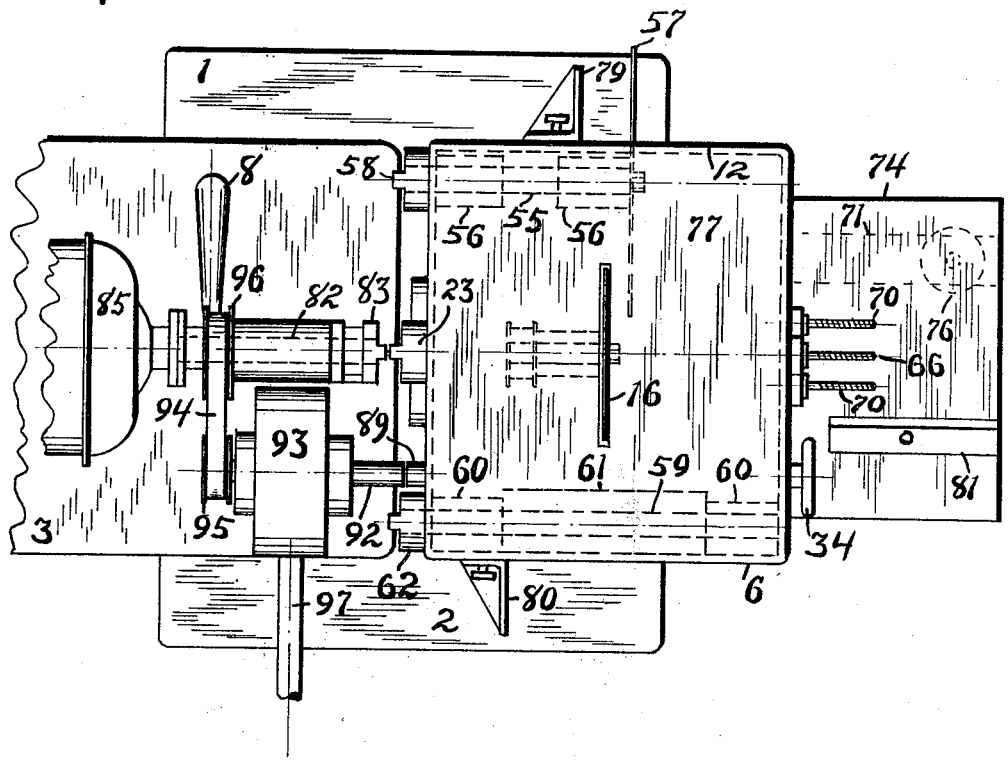

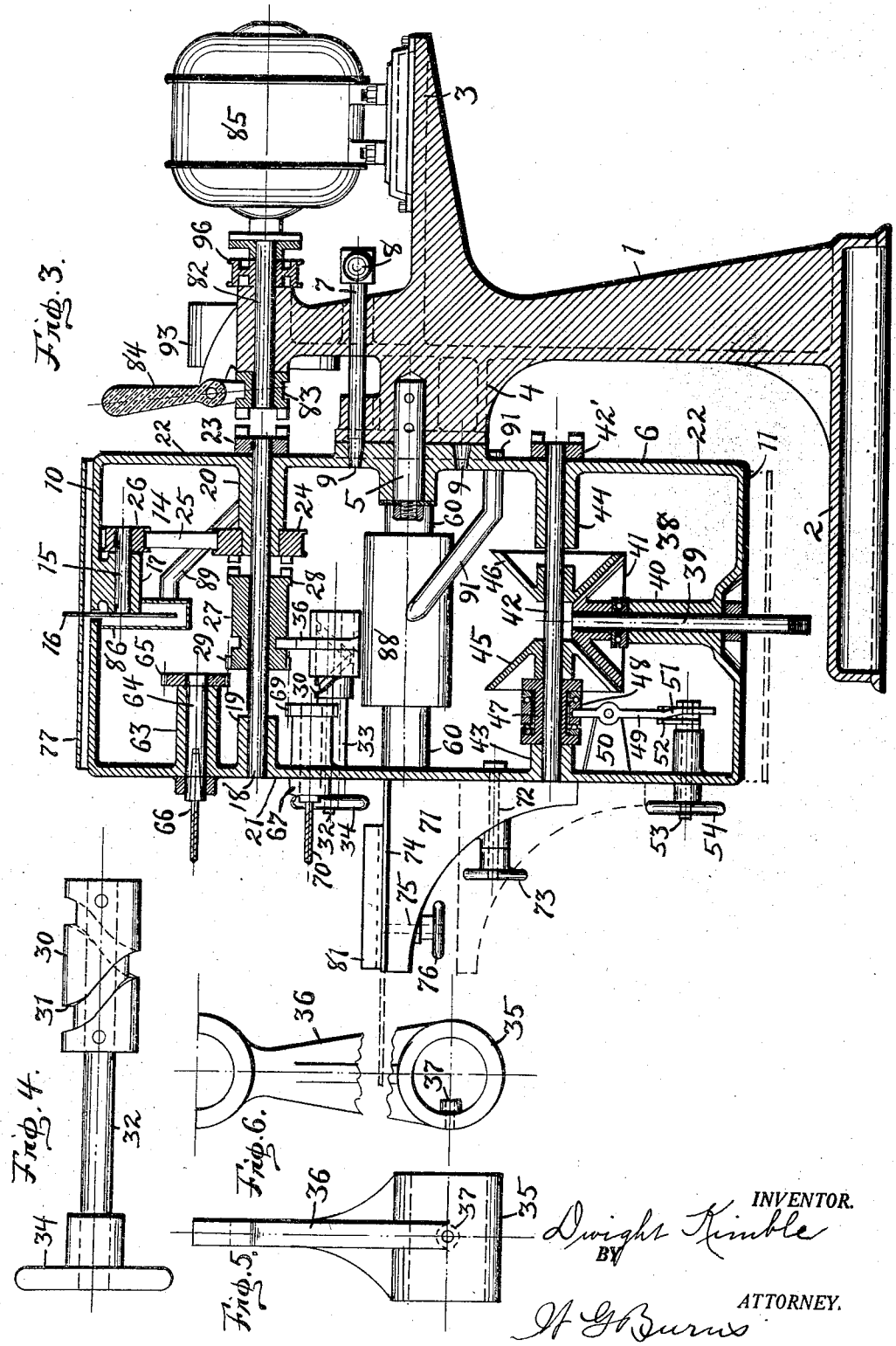

Patented July 12, 1932

1,867,269

UNITED STATES PATENT OFFICE

DWIGHT KIMBLE, OF DECATUR, INDIANA

UNIVERSAL WOOD-WORKING MACHINERY

Application filed September 28, 1931. Serial No. 565,458.

This invention relates to improvements in universal wood working machinery and the object thereof is to provide a power-driven machine that may be readily transported bodily and set up for use at the site where building operations are carried on. Another object of the improvement is to so construct the machine that it may be quickly adjusted to various positions so that different operating units provided in the machine may be selectively disposed in position for use and connected with the power shaft to be actuated thereby.

An illustrative embodiment of the invention is shown in the accompanying drawings, in which:—

Fig. 2 is a top plan view of the machine, a portion thereof being broken away;

Fig. 3 is a side elevation of the machine shown partially in central section;

Fig. 4 is a detail view showing an adjuster for one of the clutch members used in the apparatus;

Fig. 5 is a side view of a follower operated by the adjuster; and

Fig. 6 is an elevation projected from Fig. 5.

Figure 1:
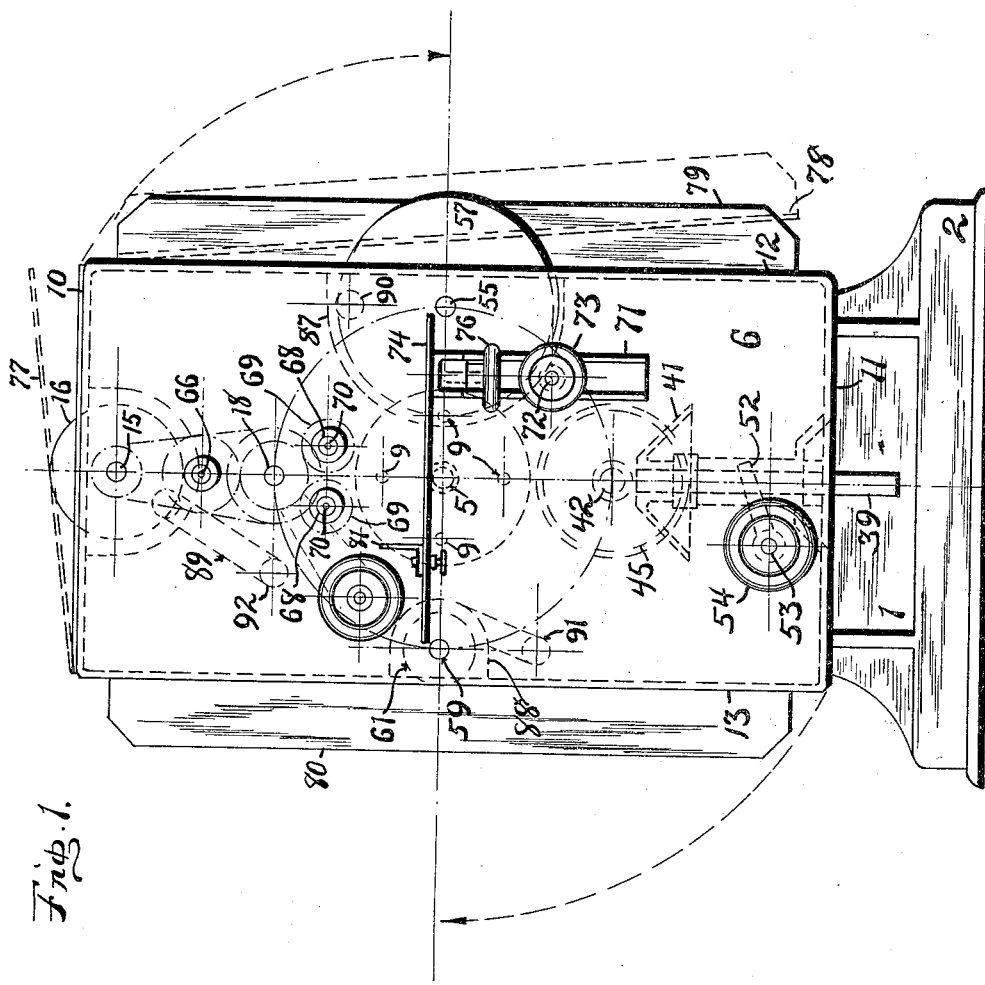
Fig. 1 is a front elevation of a machine in which the invention is embodied.

The illustrative embodiment of the invention comprises a supporting stand 1 having a base 2, a rearwardly extending shelf 3, and a forwardly extending lug 4 provided with a horizontally projecting stud 5.

A turret 6 consisting of a housing is mounted upon the stud 5 upon which it is adapted to be turned axially to various selected positions, and is held in such positions by means of a lock-bolt 7 that is projected by operating its handle 8 into suitable openings 9 respectively according to the position to which the turret is adjusted, the lock bolt being mounted and axially movable in the stand 1. Thus, either end 10 or 11, or either side 12 or 13 may be disposed in uppermost horizontal or work-supporting position by turning the turret and locking it in place.

In one end of the turret is contained a cross-cut saw unit 14 including a saw arbor 15 having thereon a cross-cut saw 16 that projects loosely through the top 10 of the turret, there being a suitable bearing 17 beneath said top in which the arbor 15 is mounted. An extension shaft 18 is disposed in parallel relation with the arbor 15 in alined bearings 19 and 20 that project inwardly from the front 21 and back 22 of the turret.

The rear end of the shaft 18 extends through the back 22 and has secured thereon a clutch member 23, and the inner end of the bearing 20 has loosely mounted thereon a clutch pulley 24 that is connected by means of a belt 25 with a pulley 26 that is secured on the rear end of the saw arbor 15. An engaging member 27 is splined on the extension shaft 18 and has axial movement thereon. One end of said member has thereon a clutch 28 adapted to have engagement with the clutch pulley 24 to actuate it when the shaft 18 is revolved, and the opposite end of said member has thereon a spur gear 29 hereinafter referred to.

An adjuster is provided whereby longitudinal movement is adjustably applied to the engaging member, which consists of a cylinder 30 provided with an external spiral groove 31 mounted upon a shaft 32 that is supported in a bearing 33 that projects inwardly from the front 21 of the turrets, the outer end of the shaft 32 having thereon a hand wheel 34. A follower consisting of a sleeve 35 provided with a laterally extending arm 36 is mounted upon the grooved cylinder 30, the said sleeve having axial movement upon said cylinder, there being a roller 37 pivotedly mounted in connection with the sleeve that projects into the spiral groove 31 in the cylinder, the outer end of the arm 36 having operative relation with the engaging member 27 so that as the hand wheel 34 is revolved the follower is moved longitudinally on the cylinder, and the engaging member thereby is actually moved upon the extension shaft accordingly.

With the end of the turret opposite the unit 14 is contained a shaper unit 38 including a spindle 39 that is mounted in a bearing 40 that projects inwardly from the end 11 of the turret. One end of the spindle projects through the end 11 of the turret and is threaded so as to have secured thereon a suitable shaper head (not shown), and the inner end of said spindle has secured thereon a friction cone 41. An extension shaft 42 is disposed in alined bearings 43 and 44 that project inwardly from the front 21 and back 22 of the turret respectively, and has secured on its rear end a clutch member 42′. The axes of said extension shaft and the spindle 39 are disposed at right angles to each other and intersect. The extension shaft 42 is revoluble in the bearings 43 and 44 and has also slight axial movement therein. Upon the extension shaft 42 are secured two friction cones 45 and 46 oppositely disposed so as to have engagement severally with corresponding opposite sides of the driven cone 41 on the spindle 39 accordingly as the extension shaft 42 is axially adjusted in its bearings.

An adjusting means for the extension shaft 42 is provided which consists of a collar 47 secured on said shaft and having thereon a thrust bearing 48. A lever 49 is pivoted on a stationary bracket 50 and has operative engagement with the thrust bearing so as to impart longitudinal movement thereto so that the shaft 42 is moved axially as said lever is tilted. The outer end of the lever 49 has an offset 51 and extends between a pair of arms 52 that are mounted upon a shaft 53 provided with a hand wheel 54 whereby upon turning of the hand wheel the lever is adjustably tilted, and thus the friction cones 45 and 46 are selectively brought into operating engagement with the friction cone 41 causing the spindle to be revolved in opposite directions accordingly.

Within the turret, at one side thereof, is journaled an extension shaft 55 in alined bearings 56 and has mounted upon its inner end a rip saw 57 and upon its opposite end a clutch member 58, said rip saw being so disposed as to project loosely through the corresponding side 12 of the turret, which arrangement constitutes a rip saw unit.

Within the turret adjacent the side thereof opposite the rip saw unit is journaled an extension shaft 59 in alined bearings 60 having thereon a planer head 61 that projects through the side 13 of the turret, and upon the rear end of said extension shaft 59 is secured a clutch member 62.

Within one end of the turret, spaced from the extension shaft 18, is a bearing 63 that extends inwardly from the front 21 in which is mounted a single spindle 64 having secured upon its inner end a spur gear 65 and having mounted in its opposite end a drill 66, said spur gear being adapted to have meshing relation with the spur gear 29 on the engaging member 27 to be actuated thereby. Also, extending inwardly from the front 21 are a pair of bearings 67 in which are mounted a corresponding pair of spindles 68, each having upon its inner end a spur gear 69 and in its outer end a drill 70, said spur gears 69 being adapted to have simultaneous meshing relation with the spur gear 29 on the engaging member 27.

Upon the front 21 of the turret is movably disposed a bracket 71 secured in adjustable positions thereon by a bolt 72 provided with a hand-wheel 73 for locking the bracket in adjusted positions, and upon the bracket is mounted a table 74 that is adapted to be adjustably moved forwardly and backwardly with respect to the turret, there being provided a bolt 75 and hand-wheel 76 for securing the table in adjusted positions on the bracket.

Upon the side 13 of the turret is positioned a table 77 through which the cross-cut saw 16 projects, over which a work piece (not shown) is adapted to be moved as it is applied to said saw, and a similar table 78 is hinged to the side 12 of the turret through which the rip saw 57 projects over which a work-piece (not shown) is adapted to be moved as it is applied to said saw, and said table is provided with an adjustable gauge 79 disposed in a plane parallel with that of the saw.

Upon the side 13 of the turret is positioned an adjustable guide 80 adjacent the planer head 61 against which a work-piece (not shown) is slid as it is applied to the planer. Also, a gauge 81 is adjustably secured upon the table 74 against which a work-piece (not shown) bears as it is applied to the drills 66 or 70.

The extension shafts 18, 42, 55 and 59 are spaced equally from the stud 5, and a drive shaft 82 is mounted horizontally in the stand 1 in the same spaced relation with the stud 5 as said extension shafts so that said extension shafts may be brought into alinement selectively with the drive-shaft 82 accordingly as the turret is adjustably positioned. The drive-shaft has splined on its forward end a clutch member 83 whereby driving relation between the drive-shaft and the clutch members on said extension shafts may be established respectively when alined therewith by adjustment of the clutch member 83 into connection with the corresponding clutch members on said extension shafts. A lever 84 is provided on the stand that is operatively engaged with the clutch member 83 whereby the clutch member 83 is manually thrown into or out of engagement with the clutch members on the corresponding extension shafts when the latter are respectively positioned in alinement with the drive-shaft. The drive-shaft 82 is connected with a motor 85 which is positioned on the shelf 3 and connected with a suitable source of energy.

A feature of the invention consists of dust pans 86, 87 and 88 disposed within the turret and arranged respectively about the cross-cut saw 16, rip saw 57 and planer head 61, each of which has connected therewith a tubular outlet 89, 90 and 91 respectively, the outer ends of which tubes extend through the back 22 of the turret at points spaced equally from the stud 5 so as to become disposed in alinement with a stationary suction pipe 92 accordingly as the turret is adjustably positioned. The suction pipe 92 is connected with an exhaust fan 93 that is connected with a drive-shaft 82 by means of a belt 94, there being pulleys 95 and 96 on the fan shaft and drive shaft for said belt. Thus, the detritus in the form of dust or shavings occasioned by operation of the saws or planer head which enters said pans during operation of the corresponding units is drawn into the fan and discharged through its outlet spout 97.

Another feature of the invention is the arrangement whereby operating relation between the extension shaft 18 is established selectively with the cross-cut saw unit, the drill spindle 64 and the drill spindles 70, by means of the engaging member 27 which is so disposed that its clutch 28 when engaged with the clutch pulley 24, the gear 29 is out of engagement with the spur gears 65 and 69. Also, the spur gears 65 and 69 being located in planes spaced apart admits of engagement of the spur gear 65 on the drill spindle 64 when the clutch 28 is out of engagement with the clutch pulley 24, and permits engagement of the spur gear 29 with the spur gears 69 only when the spur gears 29 and 65 are out of mesh and the clutch 28 is out of engagement with the clutch pulley 24. Thus, by manipulating the adjuster controlled by the hand wheel 34 and upon engagement of the clutch members 83 and 23 the cross-cut saw unit or either the drill spindle 64 or the drill spindles 70 may be actuated by the power derived from the motor.

In operating the machine the cross-cut saw unit, planer unit, shaper unit and the rip saw unit, as may be required, are brought into operating position by turning the turret so that the unit required for use and the corresponding work-supporting surface of the turret are brought uppermost, and the turret is then locked by means of the bolt 7. The lever 84 is then manipulated so that the clutch 83 on the drive shaft is brought into engagement with the clutch member on the alined extension shaft so that power is transmitted to the posed unit.

I claim:

1. A wood-working machine of the class described comprising a supporting stand, a housing pivotedly mounted on said stand having a series of work-supporting surfaces and constituting a turret, locking means to secure said turret in adjusted positions relative to the stand, a series of units positioned in said turret operatively associated respectively with said surfaces, a series of extension shafts rotatably supported in the turret operatively associated respectively with said units, said shafts being spaced equidistant from the axis of the turret and each having on one end thereof a clutch member, and a motor actuated drive-shaft supported by the stand provided with a clutch-member adapted to have engagement with the clutch members on said extension shafts severally as said shafts are moved into alinement with the drive-shaft by adjustment of said turret whereby power is imparted from said drive-shaft selectively to said units.

2. A wood-working machine of the class described, comprising a supporting stand, a turret pivotedly mounted on the stand provided with means for locking same in adjusted positions relative thereto, units disposed in the turret, each being provided with an extension shaft having actuating relation therewith, said extension shafts being equally spaced from the axis of the turret and provided with a clutch-member, a motor actuated drive-shaft supported by the stand provided with a clutch member adapted to have engagement with the clutch members on said extension shafts severally as said shafts are moved into alinement with said drive-shaft whereby power is imparted to said units selectively, pans disposed in the turret adapted to receive detritus respectively from said units, each pan having a tubular outlet the outer ends of which outlets are located at points equidistant from the axis of the turret, a suction fan having an intake disposed in position to have alinement selectively with said outlets as the corresponding units are in operating position, and means for actuating said fan concurrently with said drive-shaft.

3. In a wood-working machine having a turret in which are disposed several independently operated units and means for imparting power thereto severally, a pan associated with each of said units for receiving detritus therefrom and each being provided with a tubular outlet, and an exhaust fan having a suction pipe disposed so as to have operative connection with said outlets when the corresponding unit is in operative position.

4. In a wood-working machine, a stand, a housing adjustably pivoted on said stand and having work-supporting surfaces, a drive-shaft on said stand having means for actuating it, an extension shaft in said housing, said drive-shaft and extension shaft being adapted to be brought into or out of contact by adjustment of said housing, a clutch pulley independently mounted in said housing concentric with said extension shaft, a tool unit operating through the periphery of said housing actuated by said pulley, a second tool unit having spindles disposed in said housing parallel with said extension shaft and operating through the front of said housing, said spindles having gears respectively disposed in planes space apart, an engaging member splined on said extension shaft provided at one end with a clutch member adapted to engage said clutch pulley, its opposite end having thereon a spur gear adapted to engage the gears on said spindles, said engaging member being so disposed that its engagement with said clutch pulley and said gears is selective, and an adjuster for said engaging member.

5. In a wood-working machine a stand, a housing adjustably pivoted on said stand, a rotatable shaft journaled in said housing, actuating means on said stand engageable and disengageable with said shaft by adjustment of said housing, a clutch pulley mounted independently of said shaft, a working unit operatively related with said clutch pulley, a second working unit disposed in said housing, an engaging member adjustably disposed on said shaft having actuating relation selectively with said clutch pulley and said second working unit, and an adjuster for said engaging member.

6. In a wood-working machine, a stand, a housing pivotedly supported on the stand constituting a turret and having work-supporting surfaces, locking means on the stand for securing said turret in adjusted positions, a series of units provided respectively with tools operating through the corresponding work-supporting surfaces, each unit having an actuating shaft, a drive-shaft having actuating means therefor supported on said stand, and means for operably connecting said drive-shaft selectively with said actuating shafts by adjustably positioning the turret.

In testimony whereof I affix my signature.

DWIGHT KIMBLE.